Figure 1:
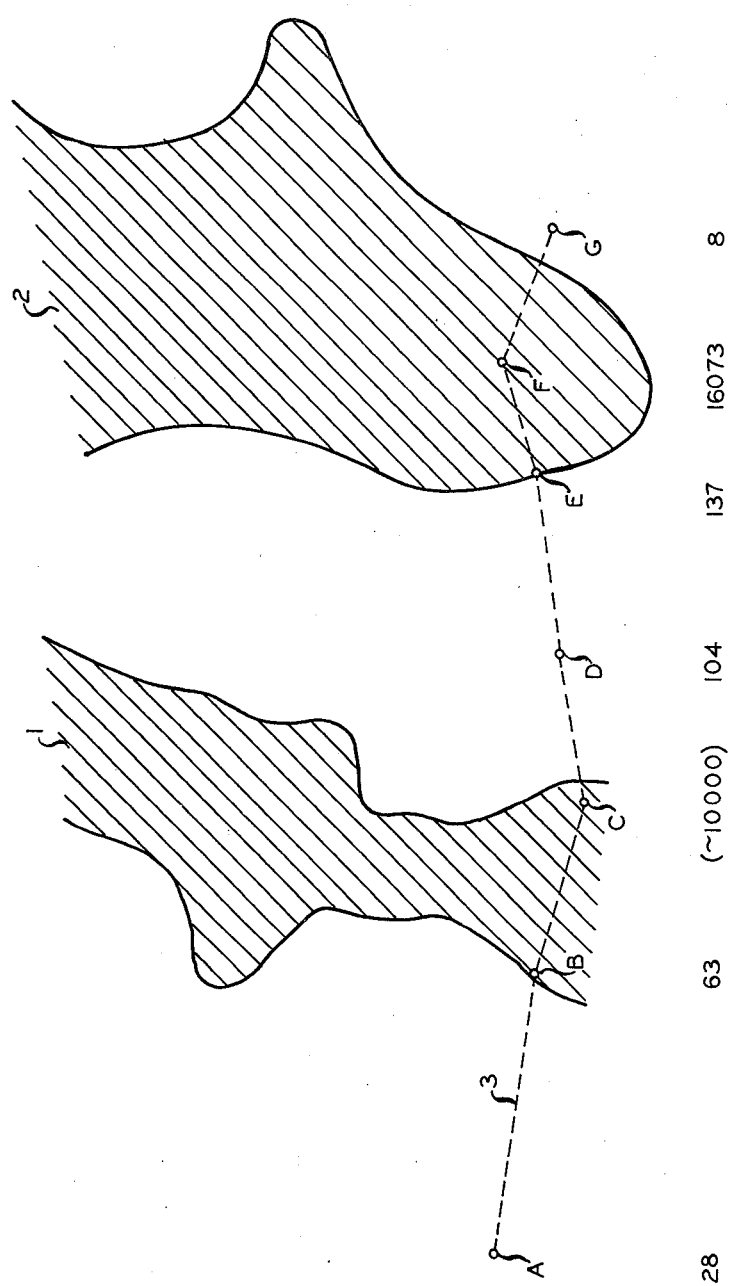

United States Patent [19]

Bartz

[11] 4,081,675

[45] Mar. 28, 1978

[54] GEOPHYSICAL AND GEOCHEMICAL EXPLORATION

[75] Inventor: Gerald L. Bartz, Bartlesville, Okla.

[73] Assignee: Phillips Petroleum Company, Bartlesville, Okla.

[21] Appl. No.: 739,764

[22] Filed: Nov. 8, 1976

[51] Int. Cl.$^2$ ............................................. G01V 5/00
[52] U.S. Cl. .................................... 250/255; 23/230.3
[58] Field of Search ............................... 250/253, 255; 23/230 EP, 230.3

[56] References Cited

U.S. PATENT DOCUMENTS

| | | | |
|---|---|---|---|
| 2,330,829 | 10/1943 | Lundberg et al. | 250/255 |
| 2,551,449 | 5/1951 | Menke | 250/255 |
| 3,968,371 | 7/1976 | Greendale | 250/255 |
| 3,988,615 | 10/1976 | Umbarger et al. | 250/253 |

OTHER PUBLICATIONS

Blanchard, R. L., Analytical Chemistry, vol. 38, No. 2, Feb. 1966, pp. 189–192.

Primary Examiner—Archie R. Borchelt

[57] ABSTRACT

The analysis of formation samples from drill cuttings for Po-210 allows the tracing and detection of possible uranium deposits from a larger distance. Furthermore, in connection with chemical uranium analysis and equivalent uranium analysis from gamma-ray countings, anomalies such as multiple bodies and the existence of bodies in disequilibrium can be detected.

6 Claims, 2 Drawing Figures

GEOPHYSICAL AND GEOCHEMICAL EXPLORATION

This invention relates to geophysical and geochemical exploration and development. More specifically, this invention relates to a process for prospecting for uranium ores.

The most common method for prospecting for subsurface uranium deposits is gamma-ray logging. This method detects the presence of gamma-ray emitting daughters of uranium, principally bismuth-214. In several cases and particularly in uranium deposits located at depths greater than several hundred feet, gamma-ray logging has proved an inadequate method for detecting uranium deposits. For instance it is not uncommon for uranium in the subsurface to migrate away from its gamma-ray emitting daughters. If uranium migration occurred within the past 500,000 years, uranium may not have emitted sufficient daughter elements and, therefore, its presence will not be detected by gamma-ray detectors. When such a situation occurs, uranium deposits only can be located if an exploratory drill hole passes through the ore body and the drill cuttings are analyzed for uranium by either of several chemical methods. The large volume of drill cutting generated by an exploratory drilling program and the fact that uranium accumulations commonly occupy only a fraction of the vertical extent of the host unit combine to make this latter geochemical prospecting method cumbersome and impractical.

Several other methods also detect the presence of subsurface uranium deposits by analyzing for regional concentrations of radon-222, a gaseous daughter element of uranium. However, secular variations in background levels of radon-222 and the short half life of radon-222 (3.8 days) combine to complicate the interpretations of the data.

To overcome these disadvantages, it has been proposed to analyze earth samples taken in depth of about 2 inches to 5 feet from the surface for their polonium-210 (Po-210) content. This Po-210 content is indicative that Rn-222 (radon-222) has been at the respective location and correspondingly that uranium is presently or was at some time in that general area.

This process of analyzing earth samples taken from the surface for Po-210 content is not accurate for prospecting for uranium deposits significantly below the surface, e.g., several hundred feet below the surface, because the radon gas migrates slowly through the formation and due to its relatively short half life time of 3.8 days, only a small quantity may reach the surface. Furthermore, the radon gas may not migrate vertically so that a correlation of the Po-210 surface analysis data and an expected uranium body location in deeper formations becomes difficult. Thus exploration and development of uranium deposits, and particularly deep deposits, requires a different tool than the surface prospecting.

THE INVENTION

It is thus one object of this invention to provide a novel process for the prospecting for uranium deposits.

Another object of this invention is to provide a novel process for prospecting for uranium deposits that are substantially below the surface.

Yet a further object of this invention is to provide a novel process for prospecting for uranium deposits which are part of multiple uranium deposits or which are in disequilibrium.

Still another object of this invention is to provide a new process for prospecting for uranium deposits by which an indication for uranium deposits is obtained for locations that are considerably far away from the deposit.

Another object of this invention is to provide a long-range sensing tool for subterranean formations.

Figure 2:
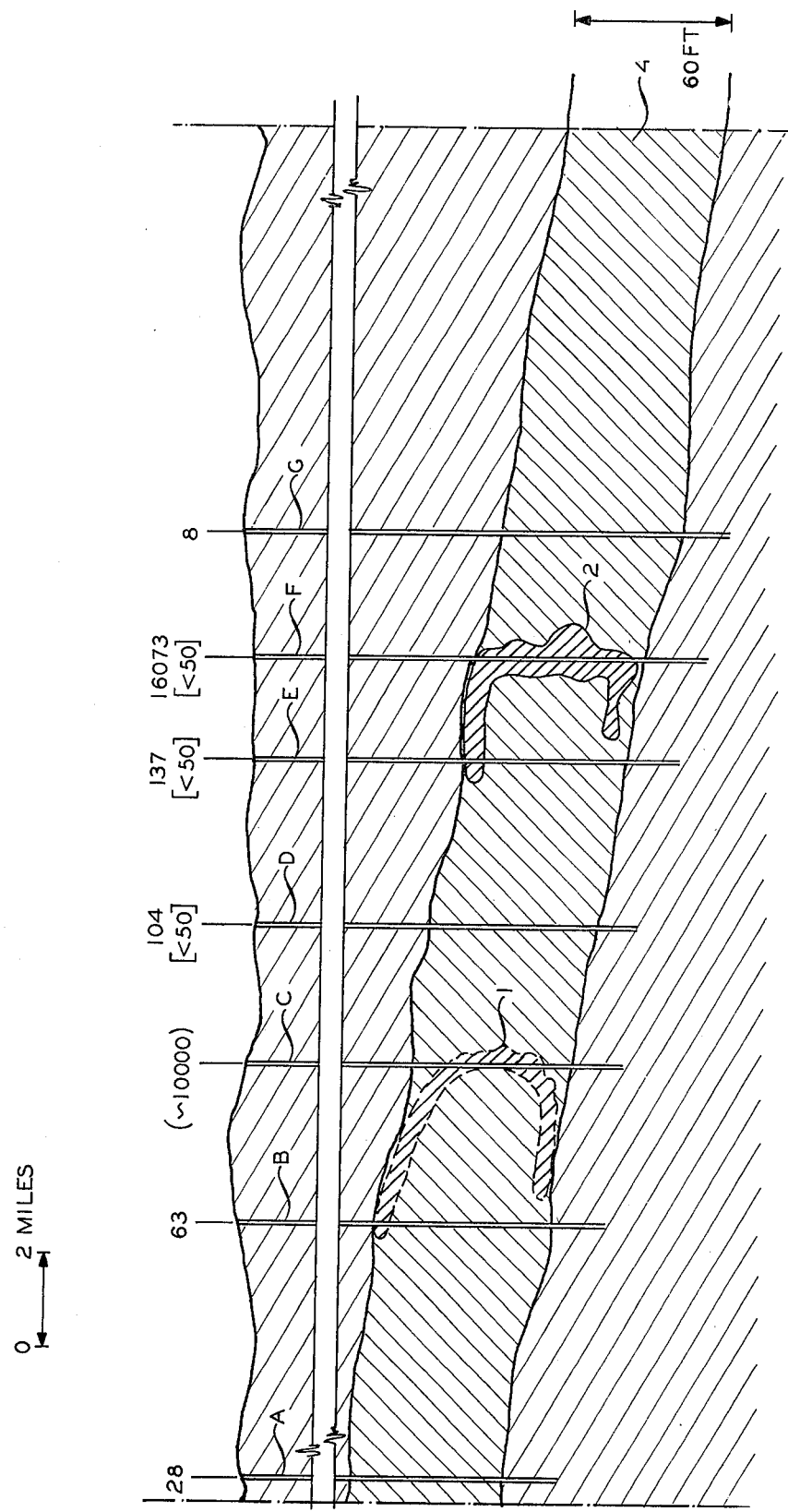

These and other objects, advantages, embodiments, details and features of this invention will become apparent to those skilled in the art from the following detailed description of the invention, the appended claims and the drawings of which FIG. 1 shows a plane view of a prospected area with drilling sites, and FIG. 2 shows a cross-sectional view through the area of FIG. 1 along the line of the drill holes shown in FIG. 1.

Some expressions used in the following are explained here in some detail:

Formation: This is a layer of permeable material in which uranium deposits are expected to be found. The formations this invention is concerned about have to be aquifier; that means they allow water carrying uranium to move through them, generally in a downward direction. Furthermore, the formations for which the prospecting process of this invention is carried out either are or have been inclined with respect to the horizon. Specifically interesting formations are characterized by having a sand/mud volume ratio of about 4:1 to 1:1. Mud is an expression used for a composite of silt and clay. In most areas of the United States, it is broadly known where such formations are located. Published data from the industry, as well as from the U.S. Geological Survey, give information on areas having high probabilities of containing uraniferous strata.

Equilibrium/disequilibrium: The migration of uranium and its decay products in formations is influenced by the chemical conditions in these formations. A uranium body is called an equilibrium body if the uranium and the solid decay products thereof stay together and migrate together. Correspondingly, if the chemistry of the formation is such that the uranium and one or more of its solid decay products move at different speeds through the formation, the respective body is called a disequilibrium body. Such a disequilibrium body may, for instance, be formed because the chemical conditions in the formation cause Bi-214 to be immobilized (precipitated), whereas uranium stays in solution and continues to migrate. In this situation a gamma-logging of the formation will result in a considerable gamma emission count which would normally be indicative of the presence of a high uranium concentration. In fact, however, the disequilibrium uranium body has moved on and no uranium, or only a small concentration thereof, would be mined from such a body.

Decay: Uranium undergoes a radioactive decay through a series of steps in which new elements are formed. The decay series of U-238, for instance, is well known in the art and described in Kirk-Othmer, *Encyclopedia of Chemical Technology*, Vol. XVII, page 10. Second completely revised edition, copyright 1968. The decay products of U-238 that are of particular importance to this invention are Rn-222, a gas; Po:210, a solid; and Bi-214, a solid. Bi-214 is the main and by far the strongest gamma source of all the decay products in the U-238 series. Po-210 can be chemically isolated and its gamma activity measured. This is an excellent prospecting tool for sensing uranium deposits from long distances where Bi-214 gamma activity is not sensitive enough for detection.

Gamma-Logging: This is a technique known in the art to detect a stronger gamma radiation in a formation than the layers above and below the formation have. This gamma-logging gives information only if the gamma radiation from uranium decay products is significantly stronger than that of other materials. Since the concentration of uranium is usually low, the gamma radiation allows tracing of a uranium ore body only at fairly short distances from the body.

Chemical uranium: This defines the concentration of uranium in the formation material. The actual value is determined by standard chemical techniques well known in the art. See, e.g. Anal. Chem., 42, 271 (1970) Rapid Spectrophotometric Determination of Uranium on Ores, by Florence, T. M. and Farrar, Y. J.

Equivalent uranium: This defines the concentration of uranium in the formation determined by the gamma activity caused by Bi-214, the main gamma emitter of the uranium decay products. A sample from the drill cuttings is taken and placed in a shallow dish. The gamma emission is counted in a sodium iodide scintillation counter. Only those scintillations that are indicative for the gamma energy of the Bi-214 emissions are counted. A $\gamma$-spectrometer such as the one commercially available from Camberra Industries, Inc., Meriden (Conn.) can be used for this purpose. The results are compared to a uranium standard (e.g., 1 g of a standard with 1% U on the standard), or to a calibration curve obtained from a series of uranium standards, which curve normally is calibrated in scintillations versus ppm uranium concentrations. The result of the equivalent uranium determination is an equivalent uranium value that may be equal to the chemical uranium, or may be different therefrom. Particularly, in disequilibrium situations, the equivalent uranium and the chemical uranium are quite different from each other.

of the roll front, whereas the tailing end thereof is called the tail of the roll front.

In accordance with this invention, I have now found that by analyzing cuttings for their Po-210 content, which cuttings have been taken from holes drilled for finding uranium-rich bodies, such bodies can be traced at relatively long distances from their location. Furthermore, the existence of multiple uranium bodies and of uranium bodies in disequilibrium can be determined. More specifically there is provided in accordance with this invention a process for prospecting for uranium deposits in which a first set of holes is drilled into a formation and at least one sample of drill cuttings from the respective formation from each hole is procured. the Po-210 content of each of these samples is determined. Thereafter a second set of holes is drilled into the formation generally at locations downdip of the hole with the highest Po-210 content of the samples. The Po-210 determination in drill cuttings, in other words, is used in accordance with this invention as an indicator to determine the existence of a uranium-containing body and in what direction this potential uranium body is located with respect to the location where the Po-210 content in the formation is actually determined. The Po-210 serves as a pathfinder element. The main advantage of using Po-210 content of the formation sample as an indicator toward a possible further uranium deposit resides in the fact that the sensitivity of the Po-210 test is much higher than other known methods such as gamma-logging.

More specifically and in accordance with a yet further preferred embodiment of this invention, in addition to the Po-210 content, the samples taken out of the formation in which uranium mineralizations or deposits are expected, are also analyzed for their chemical uranium and their equivalent uranium concentration. This is done in order to obtain some more information particularly on the possible existence of multiple uranium deposites or uranium deposits that are in disequilibrium.

The relative values of the respective determination have a meaning as shown in the following table:

TABLE I

How Invention Is Used in Determining the Direction for Drilling Next Exploratory Hole in the Location of Uranium Beds

| Situation No. | Polonium Analysis | Chemical Uranium | Equivalent Uranium | Conclusion | |
|---|---|---|---|---|---|
| | | | | Single Uranium Deposit | Multiple Uranium Deposit |
| 1 | High | Low | Low | Updip from but near to the deposit | Updip from or between two uranium bodies in the same stratum |
| 2 | High | High | Low | Near nose of roll front; migrating body in disequilibrium | Same |
| 3 | High | High | High | Center of body | Same |
| 4 | Low | Low | Low | Low probability, far away | Same |
| 5 | High | Low | High | Near tail of roll front; migrating body in disequilibrium | Same |

Updip/downdip: The formations in which uranium bodies are expected are frequently inclined or have been inclined with respect to the horizon. The uranium bodies migrate from higher locations of the formation to lower locations. The expression "updip" ("downdip") characterizes a location in the formation relatively above (below) the reference location, with respect to the inclination of the formation.

Roll Front: This expression characterizes the shape of a moving uranium-containing body in the formation. The leading edge of this moving body is called the nose The accumulation of polonium caused by the migrating uranium body is superimposed upon the polonium content resulting from the normal uranium content in the sampling zone, i.e., the non-migrating uranium. This background polonium content constitutes the limit for tracing uranium ore bodies or higher uranium concentrations in the formation. The terms "high" and "low" thus are related to the background concentration of polonium 210 and uranium, respectively. "Low" means that the polonium concentration (or, respectively, uranium concentration) is within the background size. "High" correspondingly refers to concentrations of these elements that are sufficiently above background level. For background concentrations of 25 (p Curie/100 gram) thus values between 0 and 50 are "low", whereas values considerably above 50 are called "high".

Responsive to the five different results, the following drilling operations are carried out:

Situaton 1:
  a. If there is reason to believe that a single uranium deposit is envisaged, drillings are carried out downdip of the location where Situation 1 was encountered.
  b. If multiple uranium deposits are expected, drilling is continued both updip and downdip of the respective location.
Situation 2: Further drilling is carried out close by the location where the Situation 2 is encountered and also updip of this location.
Situation 3: Development drilling is carried out around the location where the Situation 3 is encountered.
Situation 4: Drilling is either discontinued or continued at a location further away from where Situation 4 is encountered.
Situation 5: Further drilling is carried out downdip of the location where Situation 5 is encountered.

Since the gas Rn-222 does not migrate downdip from a uranium deposit, the Po-210 content of a sample taken downdip from a single uranium deposit will only equal the background polonium concentration. In the case of multiple uranium bodies, the fact that Po-210 is detected downdip of a uranium body is indicative for the presence of a secondary uranium body downdip thereof.

The following features individually and in combination constitute further preferred embodiments of this invention.

The sample of the formation materials is preferably carried out at a depth substantially below the surface, preferably several hundred feet, at least, below the surface. The invention is particularly useful for uranium bodies located at a depth of about 600 feet or more below the surface. Formations having sand to mud volume ratios of 4:1 to 1:1 are of particular interest because experience has shown that these materials have a high probability of hosting uranium bodies. Gamma-logging can be carried out as a first step to detect a hole drilled through a very high γ-activity body which may be a uranium-rich body. This is particularly desirable if equillibrium bodies are expected and a quick answer is desired to determine whether the respective drill hole is close to or in the ore body or not.

The invention will be yet more fully understood from the following description of the drawings, together with some representative and typical values and results of drill cutting anaylsis.

EXAMPLE

Six holes, A, B, D, E, F, G, have been drilled into a formation 4 as shown in FIGS. 1 and 2. The Po-210 concentrations in p Curie/100 g determined are shown in the drawing. The background concentration of Po-210 is 0 to about 30 p Curie/100 g. Around 100 to 200, further developmental holes have been drilled to determine size and boundaries of the body 2 as shown in FIGS. 1 and 2. The cross-sectional view of FIG. 2 has been taken along line 3 in FIG. 1.

From the analysis of cuttings from hole B and some further holes drilled in the general area of hole B, a uranium body 1 is expected to exist and a developmental hole C is expected to produce samples having a Po-210 concentration of around 10,000 p Curie/100 g. The fact that a Po-210 concentration of 104, i.e., well above the level of 50, that is indistinguishable over the background Po-210 level, has been found in hole D downdip of the ore body 1, was indicative for the existence of the second body 2. The very low Po-210 concentration of 8 p Curies/100 g for hole G shows that no further uranium body can be expected to have migrated from the location of the hole G to a deeper location.

In order to explain this multiple body situation further, reference is made to the drawing and the value shown for the boreholes D, E, F, in brackets. These values are based on the assumption that the second deposit, namely the uranium body 2, is not present. In this case the holes D, E, and F would have resulted in values below 50 and probably in the order of magnitrude around 25 indicating just a background polonium concentration. Thus assuming hole C resulted indeed in the high polonium concentration shown, the information from hole D indicates that there is further uranium ore to be expected downdip of the deposit 1. This information was heretofore not obtainable because the uranium both chemically and by means of gamma equivalent, and the gamma-logging, would have given no information that would have been any different from the information obtained in hole G. Actually, the following γ-logging information was obtained for these holes:

| Hole | A | B | D | E | F | G |
| --- | --- | --- | --- | --- | --- | --- |
| δ-anomaly | no | small | no | small | large | no |

The γ-logging results would not have indicated any reason to continue drilling downdip of hole D after a discovery of the body 1.

As has been shown by the example given above, the analysis of the tool cuttings of the formation for Po-210 not only is an indicator as to the presence of uranium mineralizations, but also results in a long-range indicator that shows whether it is worthwhile to continue exploration work downdip of a uranium deposit detected. In situations where the uranium bodies have specific and unusual structure that may interfere with each other, such as multiple bodies arranged side by side rather than updip and downdip from each other, and/or deposits that are not equilibrium, specific interpretations may result. Such specific interpretations take into consideration further data and information available from either geological data generally speaking or from additional exploratory drilling.

As a general rule, exploratory drilling is carried out with distances between the drill sites of about 1 to 3 miles, whereas the developmental drilling is carried out with distances between the drill sites of about 200 to 2,000 feet. The actual shape of the deposit 2 shown in FIGS. 1 and 2 is determined by about 100 to about 200 developmental drilling holes in the general area of this formation.

The process of analyzing samples for the Po-210 content can be carried out in various ways. It is presently, however, preferred to carry out this process as described in the following in order to analyze the formation host material for the surface polonium without analyzing for a background polonium contained inside of the. e.g., sand particles of the host material.

The process of analyzing for the Po-210 is done by digesting samples of 20 grams of the formation host material obtained from the drilling operations in 4N HCl for about 4 hours at a temperature within the range of about 70°–80° C under stirring. The digested samples then are filtered. The filtrate contains dissolved polonium. This filtrate is evaporated to near dryness and brought back up to 200 ml with 1N HCl. The obtained solution is then divided into two equal 100 ml portions. A reducing agent, e.g. about 7.5 g hydrazine hydrochloride, or about 5 g ascorbic acid, is added to each of the 100 ml aliquots. The reducing agent is added to eliminate the interference of iron in the following plating step by reducing the iron to the ferrous state. Then 50 micro liters of standard polonium solution containing a nominal 1.4 millimicro curie (1 millimicro curie = $10^{-9}$ curies) of Po-210 is added to one of the hundred milliliter aliquots. Then a silver planchet is submerged into each of the two solutions that are kept at a temperature of about 90° C for 4 hours while stirring. These silver planchets thereafter are withdrawn from the solution and the alpha activity of these planchets is determined in a suitable alpha proportional counting system. The concentration of polonium in the aliquot to which the standard Po-210 solution has been added is several magnitudes higher than the polonium concentration of the other 100 ml aliquots. Therefore, the concentration of Po-210 is linearly related to the known concentration by the ratio of the counted alpha decays.

The advantage of using a silver planchet for this determination is that only the Po-210 and not the Pb-210 or Bi-210 is deposited. Therefore, the results are not affected by increases of Pb-210 or Bi-210 activity on the planchet. Po-210 is counted with very high sensitivity and with very low background.

Reasonable variations and modifications which will become apparent to those skilled in the art can be made with this invention without departing from the spirit and scope thereof.

I claim:
1. A process for prospecting for uranium deposits comprising
   a. drilling a first set of holes into a formation,
   b. procuring at least one sample of drill cuttings from the formation from each hole,
   c. determining the Po-210 content of each of these samples, and thereafter
   d. drilling a second set of holes into the formation downdip of the holes where the highest Po-210 concentration has been found.

2. A process in accordance with claim 1 wherein said second set of holes is drilled in locations that lie in the direction of expected increased Po-210 concentration.

3. A process in accordance with claim 1 wherein the equilibrium uranium and the chemical uranium concentration of at least one sample from at least one hole is determined in addition to the Po-210 concentration, and wherein depending upon the relative results, the following operations are carried out:
   a. if the Po-210 content is low, the chemical uranium concentration is low and the equivalent uranium concentration is low: no further drilling is done or explorational drilling is continued further away from the respective location;
   b. if the relative Po-210 concentration is high, the chemical uranium concentration is high and the equivalent uranium concentration is high:developmental drilling around the so-defined location is carried out;
   c. if the Po-210 concentration is high, the chemical uranium concentration is low and the equivalent uranium concentration is low, further drilling is carried out around and downdip of the so-characterized location if only a single uranium deposit is expected, or further drilling is carried out updip and downdip of the so-characterized location in case multiple uranium deposits are expected;
   d. if the relative Po-210 concentration is high, the chemical uranium concentration is high and the equivalent uranium concentration is low, developmental drilling is carried out essentially updip of the so-characterized location,
   e. if the Po-210 concentration is high, the chemical uranium concentration is low, and the equivalent uranium concentration is high, developmental drilling is carried out essentially downdip of the so-characterized location, wherein updip and downdip refers to the movement of the uranium body from an updip to a downdip location, and is generally identical to higher or lower locations within the formation.

4. A process in accordance with claim 1 wherein the formation drilled into is at least several hundred feet below the surface.

5. A process in accordance with claim 1 wherein the formation has a sand-to-mud volume ratio of about 4:1 to 1:1.

6. A process in accordance with claim 1 wherein said first set of holes is gamma-logged to obtain immediate information when a strong γ-emitting body is drilled through.

* * * * *